(12) United States Patent
Galbiati

(10) Patent No.: US 8,829,837 B2
(45) Date of Patent: Sep. 9, 2014

(54) DRIVING APPARATUS FOR AN ELECTROMAGNETIC LOAD AND RELATED METHOD

(75) Inventor: Ezio Galbiati, Agnadello (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 905 days.

(21) Appl. No.: 12/894,049

(22) Filed: Sep. 29, 2010

(65) Prior Publication Data

US 2011/0074374 A1 Mar. 31, 2011

(30) Foreign Application Priority Data

Sep. 30, 2009 (IT) .......................... M12009A001675

(51) Int. Cl.
| *H02P 1/04* | (2006.01) |
| *H02P 7/00* | (2006.01) |
| *H02P 6/14* | (2006.01) |
| *H02P 6/00* | (2006.01) |
| *H02P 6/08* | (2006.01) |

(52) U.S. Cl.
CPC *H02P 6/001* (2013.01); *H02P 6/14* (2013.01); *H02P 6/085* (2013.01)
USPC ........................ 318/430; 318/400.33; 318/432

(58) Field of Classification Search
USPC ...................................... 318/400.33, 430, 432
See application file for complete search history.

(56) References Cited

U.S. PATENT DOCUMENTS

| 5,068,595 A * | 11/1991 | Kearney et al. ................ 323/316 |
| 6,008,619 A | 12/1999 | Murase et al. |
| 6,906,485 B2 * | 6/2005 | Hussein .................... 318/400.28 |
| 7,477,032 B2 * | 1/2009 | Choi et al. ...................... 318/431 |
| 2003/0102834 A1 * | 6/2003 | Hussein ........................ 318/439 |
| 2010/0141191 A1 * | 6/2010 | Chen et al. ............... 318/400.33 |

FOREIGN PATENT DOCUMENTS

| DE | 3247359 A1 | 8/1983 |
| DE | 10 2007 016 872 A1 | 10/2008 |
| EP | 1 808 955 A2 | 7/2007 |
| WO | 02/27922 A1 | 4/2002 |
| WO | 2008/148401 A1 | 12/2008 |
| WO | 2008/148401 A9 | 12/2008 |

* cited by examiner

*Primary Examiner* — Eduardo Colon Santana
*Assistant Examiner* — Gabriel Agared
(74) *Attorney, Agent, or Firm* — Seed IP Law Group PLLC

(57) ABSTRACT

A driving apparatus for an electromagnetic load, said apparatus having at least one pair of first and second transistors arranged so as to form a current path with the electromagnetic load for discharging the current produced by the electromagnetic load. The first transistor has an inherent diode between the non-drivable terminals and the apparatus is configured to control switching of the pair of first and second transistors, to diode-connect the second transistor, with said first and second transistors switched off, so that the current produced by said electromagnetic load, crossing said inherent diode, creates an overvoltage between the terminals of the second diode-configured transistor such to exceed the conduction threshold voltage thereof.

32 Claims, 8 Drawing Sheets

DRIVING APPARATUS FOR AN ELECTROMAGNETIC LOAD AND RELATED METHOD

BACKGROUND

1. Technical Field

The present disclosure relates to a driving apparatus for an electromagnetic load and related method.

2. Description of the Related Art

In driving electronic switch brushless DC motors, the rotor position is determined in order to start from the correct direction, thus avoiding to start from the opposite direction. In hard disk applications, starting from the opposite direction is to be avoided. If the motor is in a rest position, starting from the phase switching in the correct direction is very difficult because the motor, being still, does not generate any counter-electromotive force which could indicate the angular position thereof.

A technique for determining the angular position of the motor is called Inductive Sense. If the windings of the motor are sequentially excited in a three-phase brushless motor, the time employed by the current to reach a default threshold is measured for each exciting step. The inductive sense procedure processes all different response times and it is able to determine the exact position of the rotor by means of different algorithms, thus ensuring a start in the right direction.

BRIEF SUMMARY

In an embodiment, a driving apparatus for an electromagnetic load comprises at least one pair of first and second transistors both arranged so as to form a current path with the electromagnetic load for discharging the current produced by said electromagnetic load, said first transistor comprising an inherent diode between the non-drivable terminals, said apparatus comprising means to control the switching on and off of said at least one pair of first and second transistors, characterized in that it comprises means adapted to allow the second transistor to be diode-connected, with said first and second transistors being switched off, so that the current produced by said electromagnetic load, crossing said inherent diode, creates an overvoltage between the terminals of said second diode-configured transistor such to exceed the conduction threshold voltage thereof. In an embodiment, said diode-connection means comprise a switch controlled by the control means to couple the drivable terminal of the second transistor and a first non-drivable terminal of the second transistor only when discharging the current produced by said electromagnetic load. In an embodiment, the driving apparatus comprises further means adapted to increase the voltage between the first and a second non-drivable terminals of the second transistor. In an embodiment, said further means comprise the series of a resistor and a plurality of diodes arranged reciprocally in series, said series being connected between said first non-drivable terminal and the drivable terminal of the second transistor by said diode-connection means. In an embodiment, said further means comprise the series of first and second resistors connected between said first non-drivable terminal and the ground, the common terminal of said first and second resistors being connected to the drivable terminal of the second transistor by said diode-connection means. In an embodiment, said further means comprise the series of a resistor and a current generator connected between said first non-drivable terminal and the ground, the common terminal of said resistor and said current generator being connected to the drivable terminal of the second transistor by said diode-connection means. In an embodiment, said further means comprise means adapted to change the current of said generator of current according to the temperature. In an embodiment, said first and second transistors are MOS transistors, said first non-drivable terminal is the drain terminal, said second non-drivable terminal is said source terminal, and said drivable terminal is the gate terminal. In an embodiment, said electromagnetic load is a motor with three windings and said current path is achieved with two motor windings, said driving circuit comprising at least two transistor half bridges connected between a supply voltage and the ground, said first and second transistors belonging to said two transistor half bridges. In an embodiment, the driving apparatus is an integrated circuit implemented in a silicon plate. In an embodiment, the temperature sensor is integrated in said silicon plate.

In an embodiment, a method for driving an electromagnetic load comprises a step of discharging the current produced by said electromagnetic load wherein said discharging step comprises switching off first and second transistors, diode-connecting the second transistor so that the current produced by said electromagnetic load, crossing an inherent diode, creates an overvoltage between the terminals of said second diode-configured transistor such to exceed the conduction voltage. In an embodiment, the method comprises a step of measuring the time period employed by the current produced by said electromagnetic load to reach a reference current before said step of discharging the current produced by the electromagnetic load.

In an embodiment, a driving apparatus for an electromagnetic load comprises at least one pair of first and second transistors both arranged so as to form a current path with the electromagnetic load for discharging the current produced by the electromagnetic load. The first transistor comprises an inherent diode between the non-drivable terminals and the apparatus comprises means to control the switching on and off of said at least one pair of first and second transistors, means adapted to allow the second transistor to be diode connected, with said first and second transistors switched off, so that the current produced by said electromagnetic load, crossing said inherent diode, creates an overvoltage between the terminals of the second diode-configured transistor such to exceed the conduction threshold voltage thereof.

In an embodiment, an apparatus comprises: at least one pair of first and second transistors configured to form a current path to discharge current from an electromagnetic load, said first transistor comprising an inherent diode between channel couplings of the transistor; a load controller configured to control switching on and off of said at least one pair of first and second transistors, and in a discharging mode of operation, to diode-connect the second transistor, with said first and second transistors switched off, so that current from said electromagnetic load, crossing said inherent diode, creates an overvoltage between couplings of said second diode-configured transistor such to exceed a conduction threshold voltage of the diode-configured transistor. In an embodiment, said load controller comprises a switch controlled to couple a control coupling of the second transistor to a first channel coupling of the second transistor when in the discharge mode of operation. In an embodiment, the load controller comprises a timing control block configured to increase a voltage between the first and a second channel coupling of the second transistor in the discharge mode of operation. In an embodiment, said timing control block comprises a series of a resistor and a plurality of diodes arranged reciprocally in series, said series coupled between said first channel coupling and the control coupling of the second transistor by said load controller in the discharge mode of operation. In an embodiment, said timing control block comprises a series of first and second resistors coupled between said first channel coupling and a ground, a common node of said first and second resistors being coupled to the control coupling of the second transistor by said load controller in the discharge mode of operation. In an embodiment, said timing control block comprises a series of a resistor and a current generator coupled between said first channel coupling and a ground, a common node of said resistor and said current generator being coupled to the control coupling of the second transistor by said load controller in the discharge mode of operation. In an embodiment, said timing control block is configured to change a current of said current generator according to a temperature. In an embodiment, said first and second transistors are MOS transistors, said first channel coupling is a drain coupling, a second channel coupling is a source coupling, and said control coupling is a gate coupling. In an embodiment, the at least one pair of transistors are part of a driving circuit of an integrated circuit implemented in a silicon plate, the driving circuit configured to drive an electromagnetic load. In an embodiment, the apparatus further comprises a temperature sensor integrated in said silicon plate and configured to generate an indication of a temperature, wherein said timing control block comprises a series of a resistor and a current generator coupled between said first channel coupling and a ground, a common node of said resistor and said current generator being connected to the control coupling of the second transistor by said load controller in the discharge mode of operation, wherein the timing control block is coupled to the temperature sensor and is configured to change a current of said current generator based on the indication of a temperature.

In an embodiment, a method comprises, under control of a least one processing device: driving an electromagnetic load by: in a discharge mode of operation, switching off at least a first transistor and a second transistor of a plurality of transistors, said first transistor comprising an inherent diode between channel couplings of the first transistor; diode-connecting the second transistor; and coupling the first and second transistors to form a current path with the electromagnetic load so that current from said electromagnetic load, crossing said inherent diode, creates an overvoltage between couplings of said second diode-configured transistor such to exceed a conduction voltage of the diode-connected transistor. In an embodiment, driving the electromagnetic load comprises measuring a time period for a current through said electromagnetic load to reach a reference current before said discharge mode of operation. In an embodiment, diode-connecting the second transistor comprises coupling a control coupling of the second transistor to a first channel coupling of the second transistor. In an embodiment, the method further comprises increasing a voltage between the first and a second channel coupling of the second transistor in the discharge mode of operation. In an embodiment, the method comprises coupling a series of a resistor and a plurality of diodes arranged reciprocally in series, between said first channel coupling and the control coupling of the second transistor in the discharge mode of operation. In an embodiment, the method comprises coupling a series of first and second resistors between said first channel coupling and a ground and coupling a common node of said first and second resistors to the control coupling of the second transistor in the discharge mode of operation. In an embodiment, the method comprises coupling a series of a resistor and a current generator between said first channel coupling and a ground, and coupling a common node of said resistor and said current generator to the control coupling of the second transistor in the discharge mode of operation. In an embodiment, the method further comprises controlling a discharge time period in the discharge mode of operation. In an embodiment, controlling a discharge time period comprises controlling a current of a current generator according to a temperature.

In an embodiment, a system comprises: a plurality of transistors configured to receive at least one control signal and to produce inductive load drive signals in response, wherein at least a first transistor of the plurality of transistors comprises an inherent diode; and a switch configured to, in a discharging mode of operation of the system, couple a control coupling of a second transistor in the plurality of transistors to a first channel coupling of the second transistor, wherein the first and second transistors are configured in the discharging mode of operation to form a current path so that current passing through the inherent diode of the first transistor creates an overvoltage condition of the second transistor. In an embodiment, the system further comprises: a motor comprising three motor windings configured to receive the inductive load drive signals from the plurality of transistors, wherein the current path comprises two motor windings of the motor, the first transistor is part of a first transistor half bridge coupled between a supply voltage and a ground, and the second transistor is part of a second transistor half bridge coupled between the supply voltage and the ground. In an embodiment, the system further comprises a controller coupled to the plurality of transistors and the switch and configured to generate the at least one control signal provided to the plurality of transistors and a switch control signal. In an embodiment, the system comprises a timing control block configured to control a voltage between channel couplings of the second transistor in the discharge mode of operation. In an embodiment, said timing control block comprises a series of a resistor and a plurality of diodes arranged in series, said plurality of diodes coupled between said first channel coupling and the control coupling of the second transistor in the discharge mode of operation. In an embodiment, said timing control block comprises a series of first and second resistors coupled between said first channel coupling and a ground, a common node of said first and second resistors being coupled to the control coupling of the second transistor in the discharge mode of operation. In an embodiment, said timing control block comprises a series of a resistor and a current generator coupled between said first channel coupling and a ground, a common node of said resistor and said current generator being coupled to the control coupling of the second transistor in the discharge mode of operation. In an embodiment, said timing control block is configured to change a current of said current generator according to a temperature. In an embodiment, said first and second transistors are MOS transistors, said first channel coupling is a drain coupling, a second channel coupling is a source coupling, and said control coupling is a gate coupling.

In an embodiment, a system comprises: a plurality of transistors configured to drive an electromagnetic load; and means for, in a discharge mode of operation, forming a discharge current path with the electromagnetic load and at least two transistors in the plurality of transistors and creating an overvoltage condition in at least one of the transistors in the discharge current path. In an embodiment, the system further comprises means for measuring a time period for a current through said electromagnetic load to reach a reference current before said discharge mode of operation. In an embodiment, the system further comprises means for increasing a voltage between channel couplings of the at least one of the transistors in the discharge current path. In an embodiment, the system further comprises means for controlling a discharge time period in the discharge mode of operation. In an embodiment, the system further comprises means for sensing a temperature coupled to the means for controlling a discharge time.

In an embodiment, a non-transitory computer-readable medium's contents cause an electronic device to perform a method, the method comprising: driving an electromagnetic load by: in a discharge mode of operation, switching off at least a first transistor and a second transistor of a plurality of transistors, said first transistor comprising an inherent diode between channel connections of the first transistor; coupling a channel connection of the second transistor to a control connection of the second transistor; and coupling the first and second transistors to form a current path with the electromagnetic load so that current from said electromagnetic load, crossing said inherent diode, creates an overvoltage between connections of said second diode-configured transistor. In an embodiment, driving the electromagnetic load comprises measuring a time period for a current through said electromagnetic load to reach a reference current before said discharge mode of operation. In an embodiment, the method further comprises increasing a voltage between the first and a second channel connection of the second transistor in the discharge mode of operation. In an embodiment, the method further comprises controlling a discharge time period in the discharge mode of operation. In an embodiment, controlling a discharge time period comprises controlling a current of a current generator according to a temperature.

BRIEF DESCRIPTION OF THE SEVERAL VIEWS OF THE DRAWINGS

Features and advantages of embodiments will be apparent from the following detailed description of example embodiments, shown by way of non-limiting example in the accompanying drawings, in which.

DETAILED DESCRIPTION

In the following description, numerous specific details are given to provide a thorough understanding of embodiments. The embodiments can be practiced without one or more of the specific details, or with other methods, components, materials, etc. In other instances, well-known structures, materials, or operations, such as, for example, details of transistors, microprocessors, or motors, are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" "according to an embodiment" or "in an embodiment" and similar phrases in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
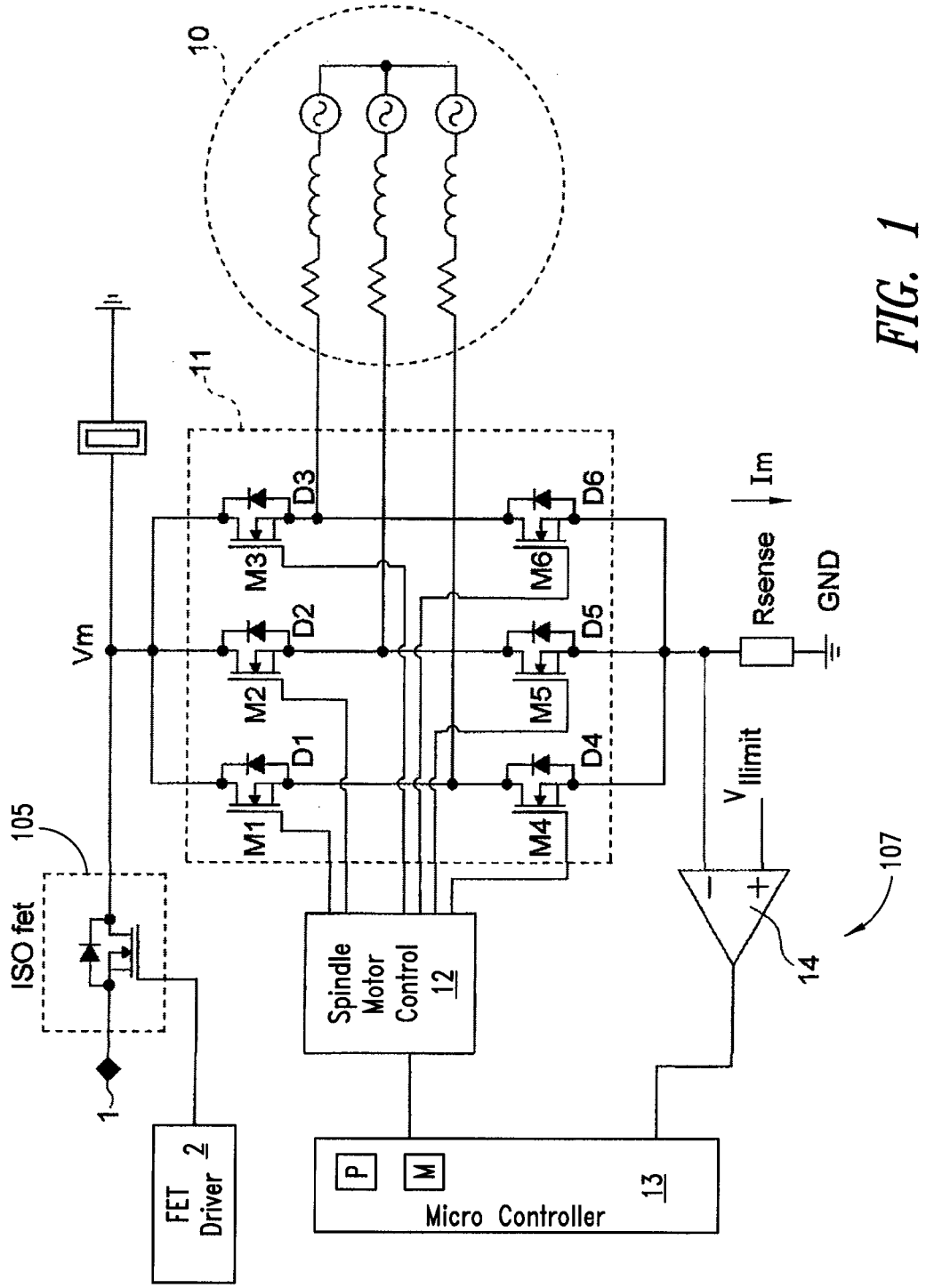
FIG. 1 shows a diagram of a driving apparatus of a spindle motor.

FIG. 1 shows a block diagram related to for a controller 107 controlling a load, such as a spindle motor 10 included in a power combo for hard disk application. The power stage 11 comprises three half bridges M1-M4, M2-M5, M3-M6 in a push pull configuration with inherent diodes D1-D6 thereof, additional diodes may be employed; each half bridge comprises two N-channel MOS transistors, but they could be P-channel, or other transistor types, or in a mixed configuration. The three half bridges are connected between the supply voltage Vm and the ground GND by a sense resistor Rsense; the voltage Vm is supplied by a power supply 1 and between the power supply 1 and the voltage line Vm there is an IsoFet 105 driven by a FET driver 2. Each half bridge is coupled to a winding of the spindle motor 10; the phase switching of the motor is carried out by a load control block 12 (for example, a Spindle Motor Controller) assisted by the microcontroller 13. The microcontroller 13 as illustrated comprises a processor P and a memory M. The memory M may store instructions for execution by the processor P. The various control modules, such as the microprocessor 13 and the control block 12, may be combined.

To carry out the Inductive Sense method, one of the configurations of the motor windings is activated and the time T1 for the winding current to reach a default threshold Ilimit is measured, directly or indirectly.

The voltage drop across the resistor Rsense generated by the current circulating in the motor phases is compared to the reference voltage $V_{Ilimit}$ corresponding to the reference Ilimit by a comparator 14. The output of the comparator is then read by the microcontroller 13. Once the current Im of the motor has reached the threshold Ilimit and the microcontroller 13 has carried out the measurement of the time T1 required for the current Im of the motor to reach the default level, the current Im produced by the motor is cleared for performing another measurement with another configuration of the motor windings.

Figure 2:
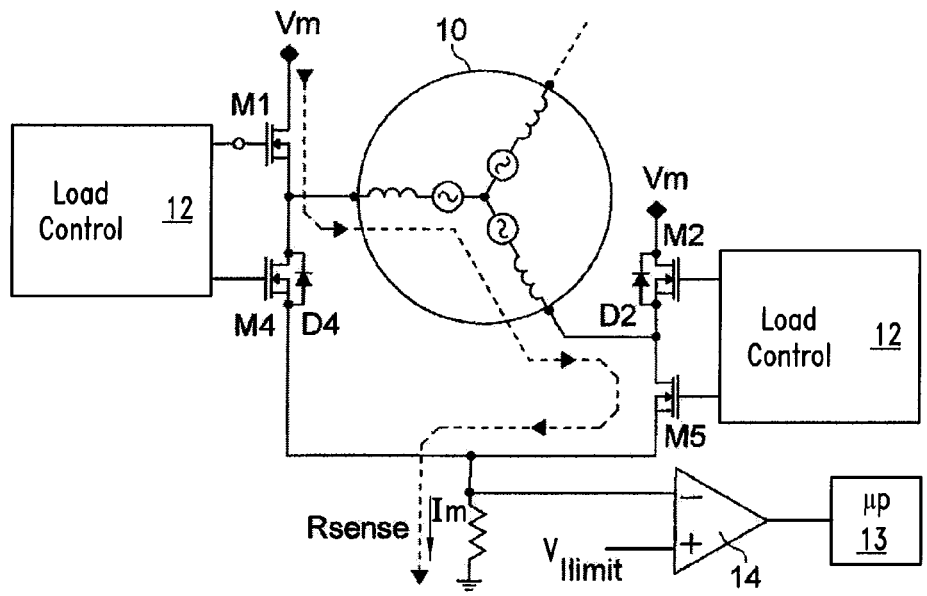
FIG. 2 shows a diagram for the circulation of the motor current in the measuring step.

In order to determine the response time of the motor current in phase AB, for example, transistor M1 and transistor M5 are switched on, as seen in FIG. 2. The current Im circulating within the two motor windings is read by means of the voltage drop across the resistor Rsense; once the voltage across the resistor Rsense exceeds the voltage threshold $V_{Ilimit}$ corresponding to the reference Ilimit, the output of the comparator will change its status and this allows the microcontroller 13 to carry out the measurement of the response time related to the actuation phase AB.

Figure 3:
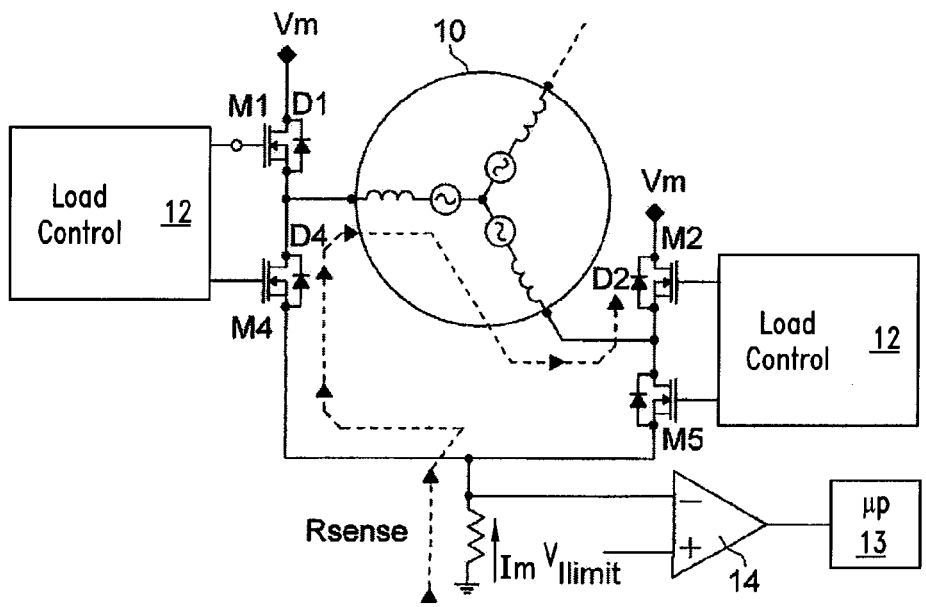
FIG. 3 shows a possible circulation of the motor current in the discharging step.

While measuring or immediately after having measured said first time period, the MOS transistors M1 and M5 previously switched on are switched off thus activating a fast recirculation phase of the motor current. FIG. 3 shows the discharge path of the motor current occurring through the supply line Vm through the inherent diodes of the MOS transistors M4 and M2. Thereby, there is a fast discharge of the motor current which, however, flows back to the supply line Vm and to the external power supply 1. If the IsoFET 105 is switched off for avoiding the current from flowing back to the power supply, the recirculation current of the motor may generate overvoltages on the line Vm, which, if not controlled, may damage the output stage or the power combo itself.

Figure 4:
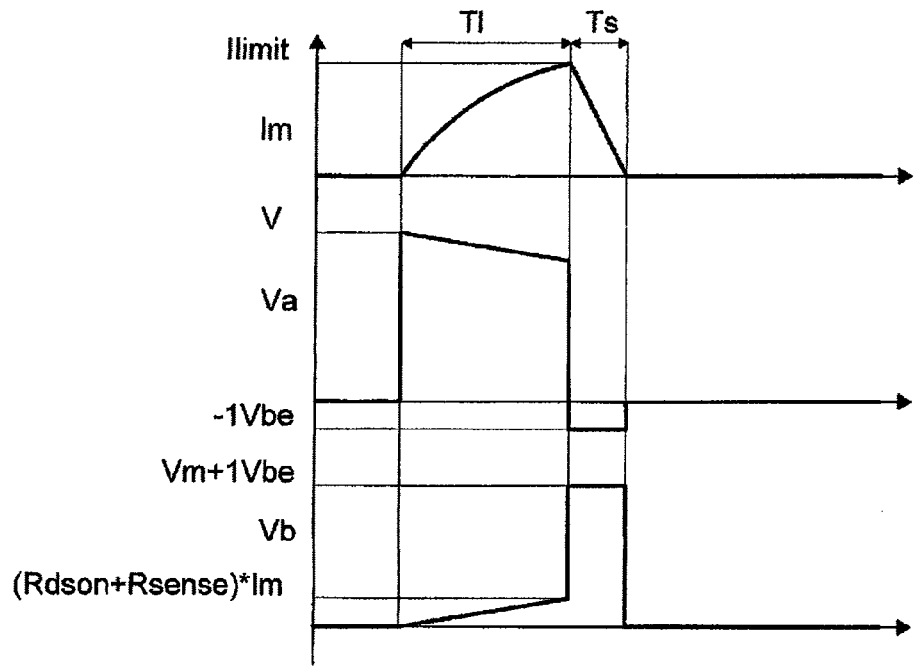
FIG. 4 shows time charts of the motor current and voltages on the output terminals of two half bridges of the driving apparatus in FIG. 1 in the discharging step in FIG. 3.

FIG. 4 shows example time charts of the current Im produced by the motor with the two output voltages Va and Vb of the half bridges M1-M4, M2-M5 being switched on in the actuation phase just described. The output of the half bridge M1-M4 is driven to the Vm potential, while the output of the half bridge M2-M5 is driven to the potential of ground GND. Therefore, the current Im of the motor may increase up to reaching the Ilimit threshold and the corresponding voltage Vb will be given by Vb=(Rdson+Rsense)*Im where the resistor Rdson is the switch on-resistor of transistor M5. Upon reaching the threshold, the transistors M1 and M5 are switched off and the motor current Im starts discharging towards the line Vm, through the inherent diodes by employing a time period Ts1. Hence the voltage Va of the output of the half bridge M1-M4 is forced to a voltage equal to the voltage of the inherent diode of the MOS transistor M4, i.e., the voltage Vbe, under the voltage of ground GND while the voltage Vb of the output of the half bridge M2-M5 is forced to a voltage Vbe, i.e., the voltage of the inherent diode of the MOS transistor M2, over the voltage Vm.

Figure 5:
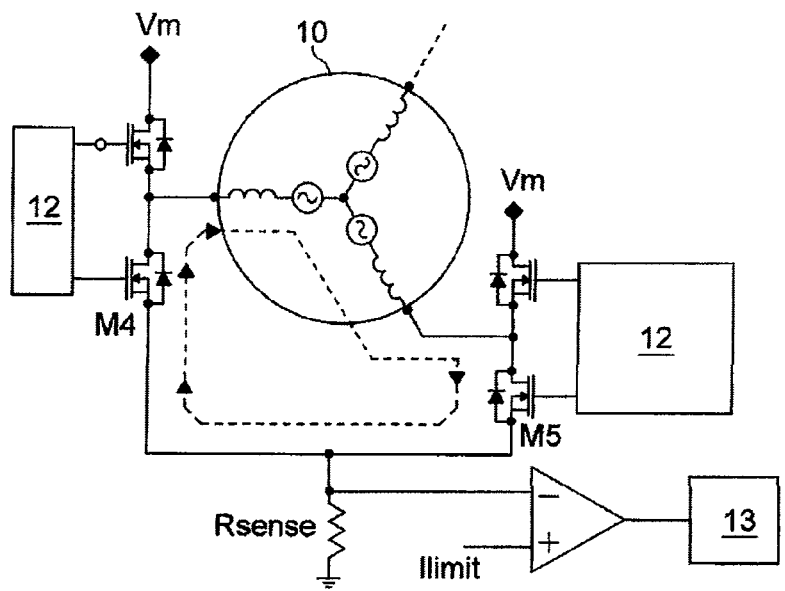
FIG. 5 shows another possible circulation of the motor current in the discharging step.

In order to avoid the motor current from recirculating towards the supply line Vm and clearing the motor current Im once the value Ilimit has been reached, a slow recirculation path may be activated by switching on the transistors M4 and M5, as seen in FIG. 5. The current takes much more time to completely discharge than the previous case, as seen in the time charts of FIG. 6. As the activation of the various configurations of the motor is carried out under the same conditions of null initial current of the motor in order to determine the exact position of the motor, the case in which the motor current is discharged through two MOS low sides dramatically extends the time required to complete the Inductive Sense procedure. In applications where the Inductive Sense procedure is repeated many times, not only to determine the starting position of the rotor, but even to carry out the closed loop acceleration phase of the motor, the time extension of the Inductive Sense procedure is limitative.

Figure 7:
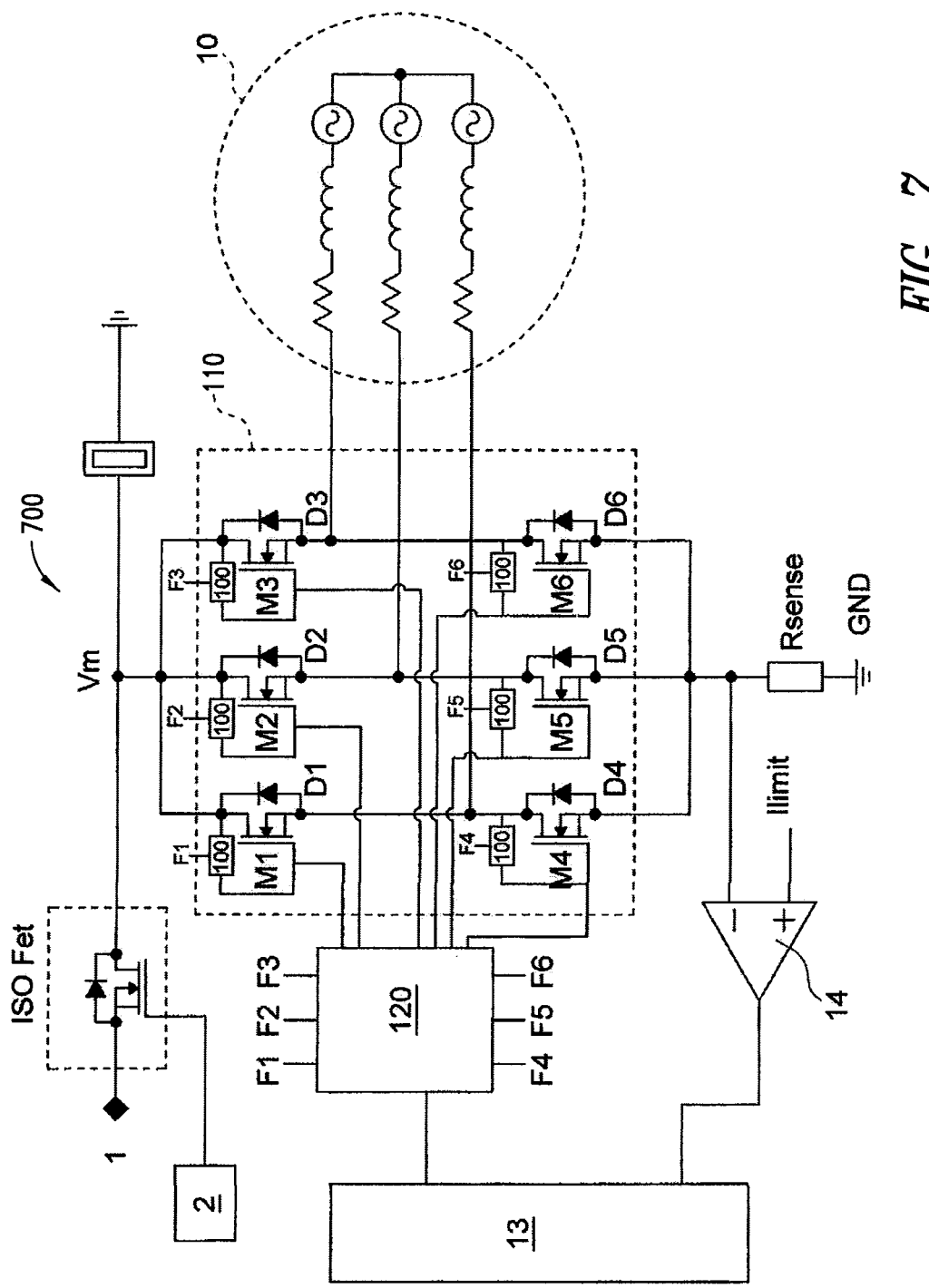
FIG. 7 shows a driving apparatus for an electromagnetic load.

With reference to FIG. 7, a driving apparatus 700 for an electromagnetic load is shown. The apparatus comprises at least one pair of a first transistor M4 and a second transistor M5, as illustrated MOS transistors, both configured so as to form a current path with the electromagnetic load 10 for discharging the current Im produced by the electromagnetic load 10; the first transistor comprises an inherent diode D4 between the non-drivable source and drain terminals, or channel couplings, of the transistor. The apparatus comprises a controller 120 to control switching on and off the first M4 and second M5 transistors, and a block 100 configured to allow the second transistor M5 to be diode-connected, with the first and second transistors being switched off, so that the current Im crossing the inherent diode D4 creates an overvoltage between the non-drivable terminals D and S, i.e., the respective drain and source terminals, of the second diode-configured transistor M5 such to exceed the conduction threshold voltage Vt thereof.

In, for example, the particular case in which the electromagnetic load is a spindle motor 10, the driving apparatus is similar to that seen in FIG. 1 but wherein at least some of the transistors M1-M6, forming the half bridges for driving the spindle motor 10, are provided with said block 100 operable by convenient controls F1-F6 from the control device 120. The driving apparatus comprises a power stage 110 comprising three half bridges M1-M4, M2-M5, M3-M6 in a push pull configuration; each half bridge comprises two N-channel MOS transistors (but they could be P-channel or other transistor types or in a mixed configuration). The three half bridges are connected between the supply voltage Vm and the ground GND by a sense resistor Rsense; the voltage Vm is supplied by a power supply 1 and between the power supply 1 and the voltage line Vm there is an IsoFet driven by a circuitry 2. Each half bridge is connected to a winding of the spindle motor 10; the phase switching of the motor is carried out by the control device 120 assisted by the microcontroller 13.

The step of discharging the spindle motor 10 preferably follows the step of measuring the time required for the winding current of the spindle motor 10 to reach a default threshold Ilimit. As discussed above, said measuring step comprises, for example, comparing the voltage flowing into the resistor Rsense generated by the current circulating in the motor phases to the voltage threshold equivalent to the reference Ilimit by means of a comparator. The output of the comparator is then read by the microcontroller 13.

The blocks 100 are configured to couple the gate terminal, or control coupling, of one of the transistors M1-M6 to the drain terminal of the same transistor.

Figure 8:
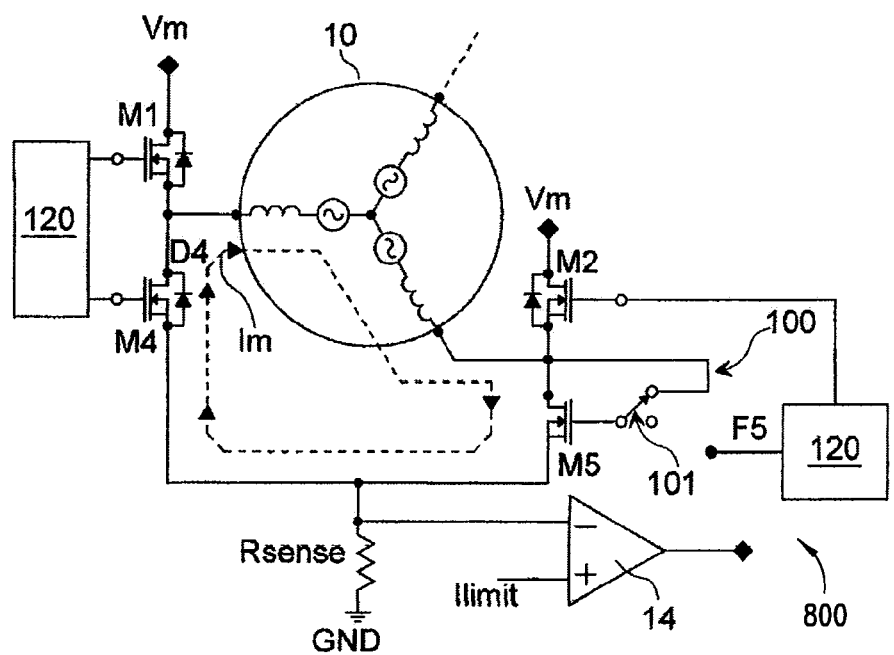
FIG. 8 shows a driving apparatus for an electromagnetic load.

FIG. 8 shows a driving apparatus 800 for an electromagnetic load similar to the embodiment of FIG. 7. The blocks 100 of the driving apparatus 800 in FIG. 8 comprise a switch 101 driven by the control device 120. When the current circulating in the motor 10 needs to be discharged or recirculated, for example, after the step of measuring the current Im, the control device 120 switches off both transistors M4 and M5 and switches on the switch 101 by the control F5 so as to allow the drain D and gate G terminals of the transistor M5 to be connected. The current Im flowing through the inherent diode D4 causes an overvoltage between the drain D and source S terminals of the diode-configured MOS transistor M5; said overvoltage exceeds the conduction threshold voltage Vt of the diode-configured transistor M5 so that the current Im may circulate through said diode-configured transistor M5. After a short time period Ts, the current Im will dissipate.

The discharge voltage is given by the voltage Vbe across the inherent diode D4 of the MOS transistor M4 and the voltage Vds between the drain D and source S terminals of transistor M5.

Figure 9:
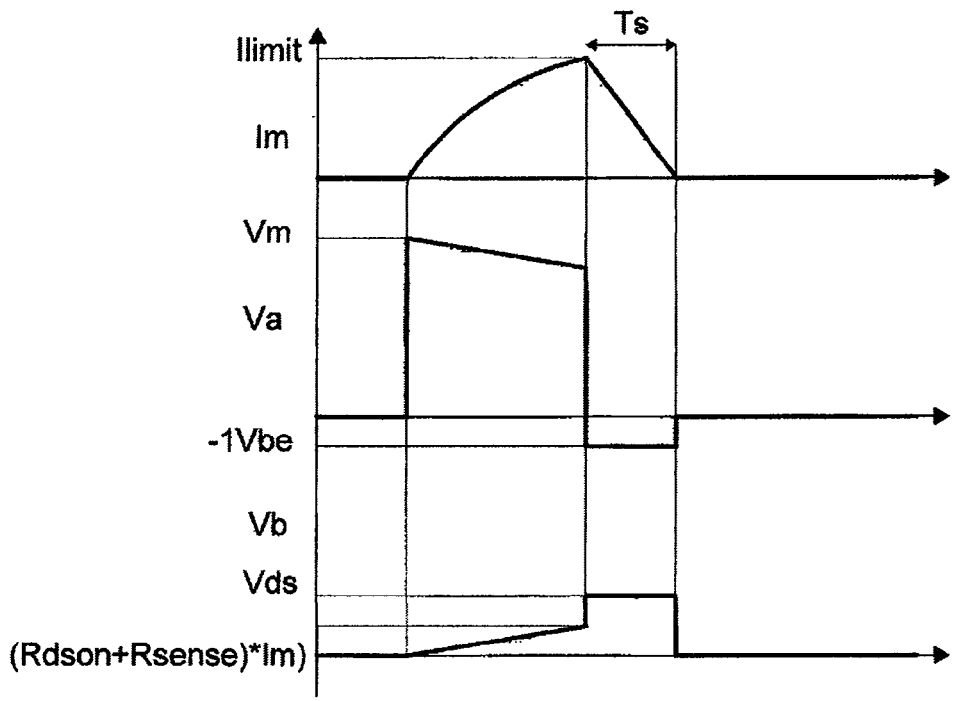
FIG. 9 shows time charts of the motor current and voltages on the output terminals of two half bridges for the apparatus in FIG. 8.

FIG. 9 shows the time charts of current Im and voltages Va and Vb for the driving apparatus shown in FIG. 8. The time charts of current Im and voltages Va and Vb are shown when measuring the time required for the current Im to reach the current reference Ilimit and during the step of discharging the current. Therefore, during the measuring step, the current Im of the motor may increase up to reaching the Ilimit threshold and the corresponding voltage Vb will be given by Vb=(Rdson+Rsense)*Im where the resistor Rdson is the switch on-resistor of transistor M5. During the discharging step, the voltage Va is forced to a voltage equal to the voltage of the inherent diode D4 of the MOS transistor M4, i.e., the voltage Vbe, under the ground voltage GND.

Figure 6:
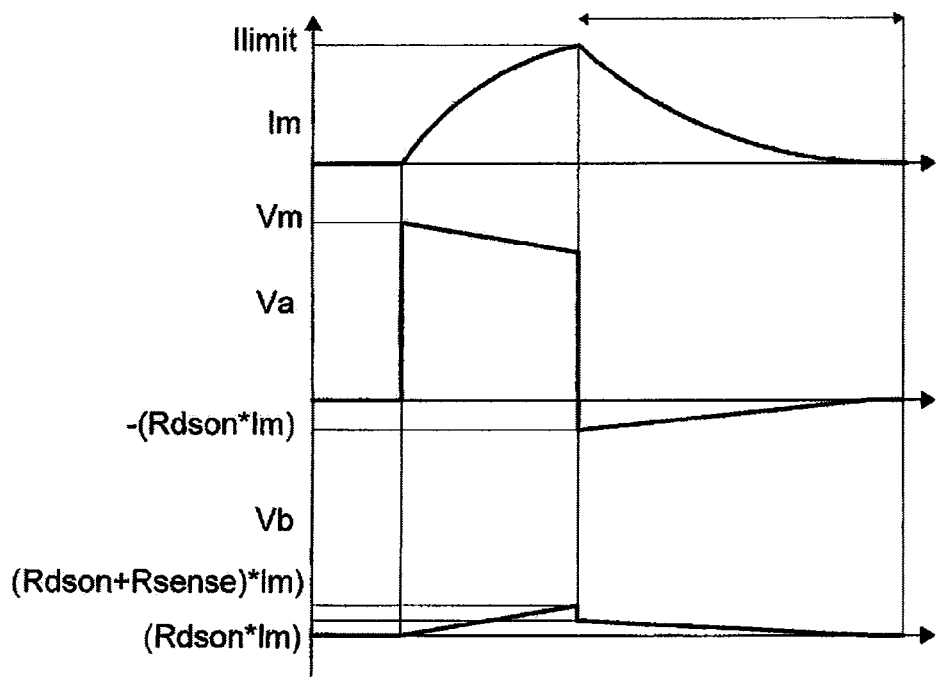
FIG. 6 shows time charts of the motor current and voltages on the output terminals of two half bridges of the driving apparatus in FIG. 1 in the discharging step in FIG. 5.

It is noted how the time period Ts for dissipating the current Im is shorter than the case in which the transistors M4 and M5 were switched off without a diode-configuration of transistor M5 (FIGS. 5 and 6). The time period Ts for dissipating the current Im depends on the value of the voltage Vds at the drain and source terminals of the diode-configured transistor M5. By increasing the value of the voltage Vds the time period Ts decreases.

Figure 10:
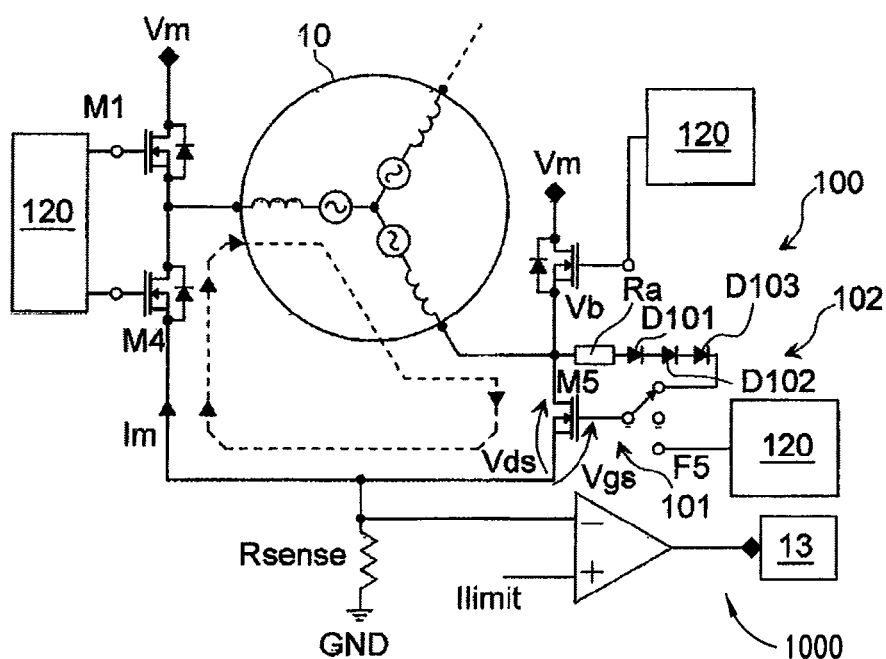
FIG. 10 shows a driving apparatus for an electromagnetic load.

FIG. 10 shows a driving apparatus 1000 for an electromagnetic load. The driving apparatus of FIG. 10 is different from the driving apparatus of FIG. 7 due to the presence of a timing control block 102 configured to accelerate the current discharge through the current path of inherent diode D4, the electromagnetic load, for example made of two windings of the spindle motor 10, and diode-configured transistor M5.

The block 102 in FIG. 10 comprises a resistor Ra and three diodes D101-D103 arranged in series. The block 102 is coupled between the drain D terminal of transistor M5 and the switch 101; with the switch 101 being closed, the block 102 is coupled between the drain D and gate terminals of transistor M5. In such a case, the voltage Vds is equal to the voltage between the source and gate terminals Vgs of transistor M5 with, in addition, the voltages across the diodes D101-D103.

Figure 11:
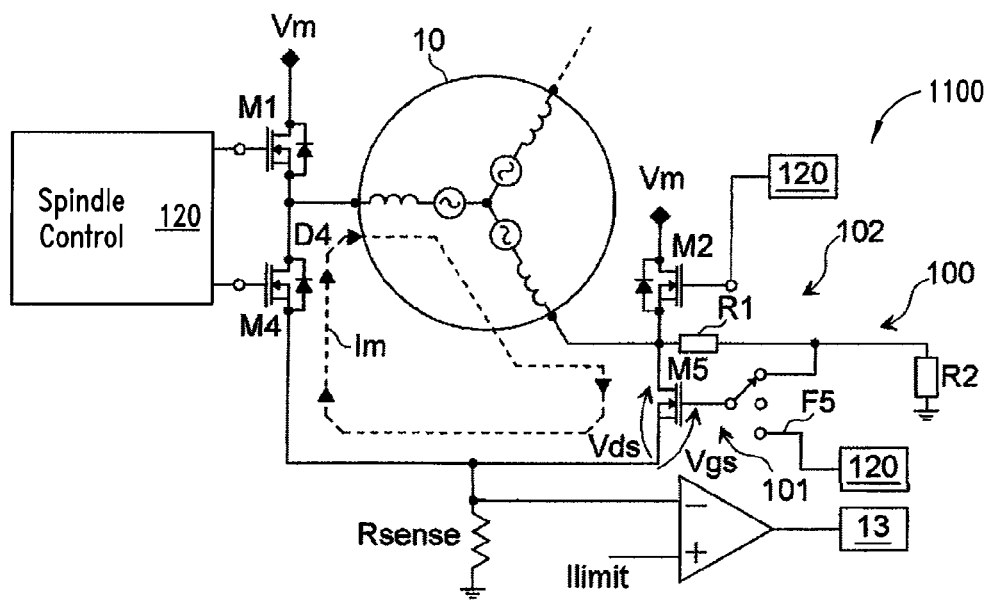
FIG. 11 shows a driving apparatus for an electromagnetic load.
Figure 12:
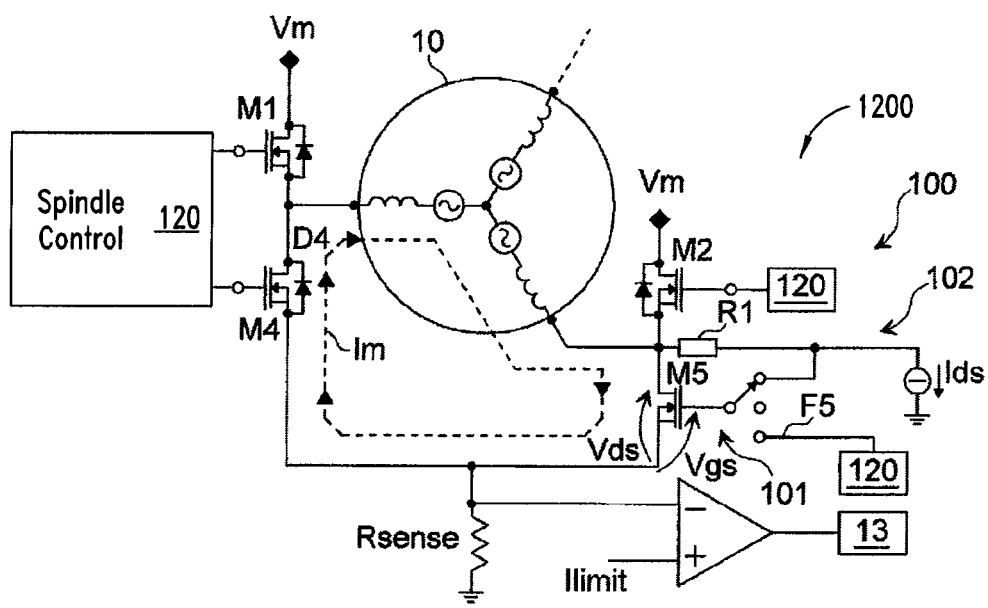
FIG. 12 shows a driving apparatus for an electromagnetic load.
Figure 13:
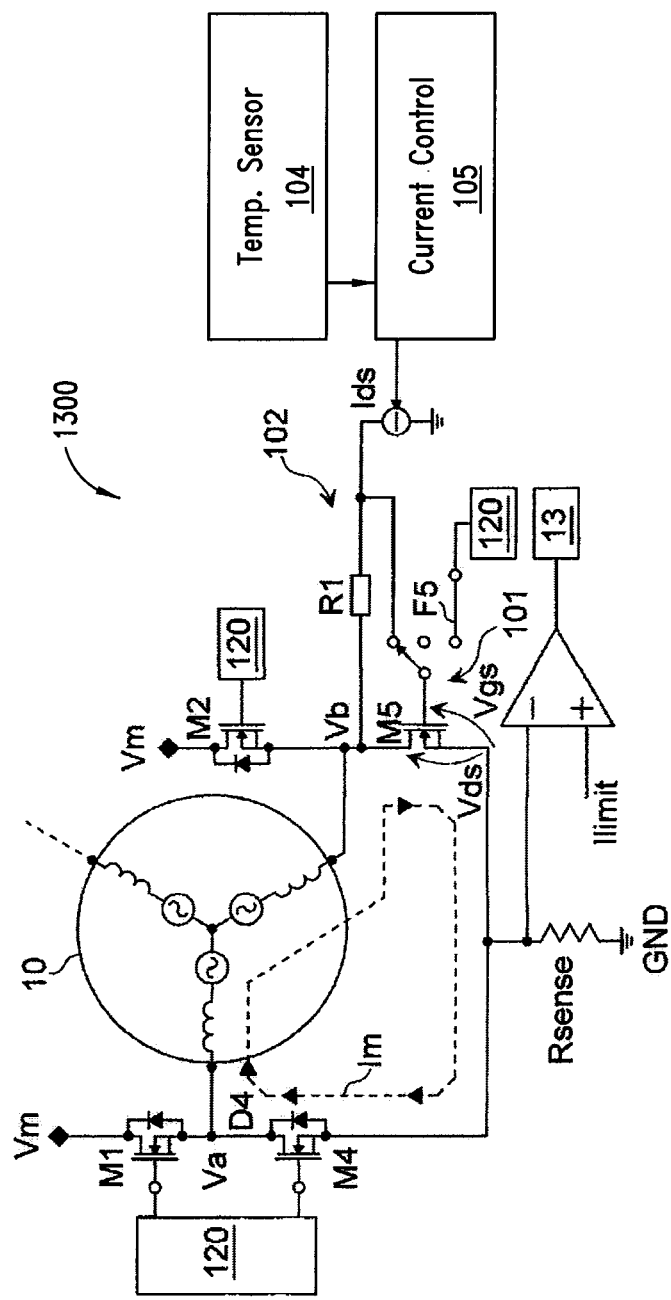
FIG. 13 shows a driving apparatus for an electromagnetic load.

FIGS. 11-13 show driving apparatuses for an electromagnetic load in accordance with variations of the driving apparatus 1000 of FIG. 10.

The block 102 in the apparatus 1100 of FIG. 11 comprises a series of two resistors R1 and R2 connected between the drain terminal of transistor M5 and the ground GND; the common node or terminal of the two resistors is coupled to the gate G terminal by the switch 101 so that, with the switch 101 being closed, said common terminal is the gate G terminal of transistor M5. Thereby, the relationship between the voltage Vgs and the voltage Vds of transistor M5 is given by the following formula:

$$Vds = \frac{Vgs \times (R1 + R2)}{R2}.$$

Therefore, by changing the resistive relationship between the resistors R1 and R2, a gain factor is introduced between the voltage Vgs and the voltage Vds.

The block 102 in the apparatus 1200 of FIG. 12, unlike the block 102 in FIG. 11, comprises a generator of constant current Ids instead of the resistor R2. Thereby, the relationship between Vgs and Vds of said MOS is given by the following formula:

$$Vds = Vgs + R1 \times Ids.$$

Also in this case, by acting either on the value of resistor R1 or on the value of the constant current Ids, the value of the voltage Vds may be changed. Therefore, having a programmability of resistor R1 and/or current Ids, the discharge time Ts of the current Im may be controlled by acting on the value of the voltage Vds of transistor M5.

In addition to the block 102 in FIG. 12, a closed loop control of the voltage Vgs may be implemented at the temperature of the silicon plate in which the driving apparatus for the electromagnetic load is constructed, as seen in the apparatus 1300 of FIG. 13 in accordance with a further variation of the embodiment of FIG. 8. The acceleration of the discharge time Ts of the current Im by increasing the voltage Vgs of transistor M5, implies increasing the dissipated power of the transistor M5 itself.

By using a temperature sensor 104, for example integrated in the same device, the dissipated power of transistor M5 may be controlled using a control device 105 of the current value of the generator of current Ids.

If the silicon temperature is low, the device 105 increases the value of the current Ids thus obtaining a higher Vds and a faster discharge of the current Im.

On the other hand, if the silicon temperature increases, the device 105 decreases the value of the current Ids thus obtaining a lower voltage Vds and a slower discharge of the current Im.

Therefore, the discharge time Ts of the current Im is conditioned by controlling the silicon temperature: with the device being cold, the discharge is accelerated by increasing the Vds of transistor M5, with the device being hot the discharge is slowed down by decreasing the voltage Vds by decreasing the dissipated power during this step from the MOS transistor M5.

An integrated circuit in a silicon plate may be implemented, the circuit comprising the driving apparatus for an electromagnetic load in accordance with, for example, the several embodiments described herein.

Some embodiments may take the form of computer program products. For example, according to one embodiment there is provided a computer readable medium comprising a computer program adapted to perform one or more of the methods described above. The medium may be a non-transitory medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the systems and/or modules may be implemented or provided in other manners, such as at least partially in firmware and/or hardware, including, but not limited to, one or more application-specific integrated circuits (ASICs), discrete circuitry, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology. In some embodiments, some of the modules or controllers separately described herein may be combined, split into further modules and/or split and recombined in various manners.

The systems, modules and data structures may also be transmitted as generated data signals (e.g., as part of a carrier wave) on a variety of computer-readable transmission mediums, including wireless-based and wired/cable-based mediums.

The various embodiments described above can be combined to provide further embodiments. Aspects of the embodiments can be modified, if necessary to employ concepts of various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An apparatus, comprising:
at least one pair of first and second transistors configured to form a current path to discharge current from an electromagnetic load, said first transistor comprising an inherent diode between channel couplings of the transistor; and
a load controller configured to control switching on and off of said at least one pair of first and second transistors, and in a discharging mode of operation, to couple a control coupling of the second transistor to a first channel coupling of the second transistor, with said first and second transistors switched off, so that current from said electromagnetic load, crossing said inherent diode, creates a voltage between conduction couplings of said second transistor, wherein said load controller comprises a switch controlled to couple the control coupling of the second transistor to the first channel coupling of the second transistor when in the discharge mode of operation.

2. The apparatus according to claim 1 wherein the load controller comprises a timing control block configured to increase a voltage between the first and a second channel coupling of the second transistor in the discharge mode of operation.

3. The apparatus according to claim 2 wherein said timing control block comprises a series of a resistor and a plurality of diodes arranged reciprocally in series, said series coupled between said first channel coupling and the control coupling of the second transistor by said load controller in the discharge mode of operation.

4. The apparatus according to claim 2 wherein said timing control block comprises a series of first and second resistors coupled between said first channel coupling and a ground, a common node of said first and second resistors being coupled to the control coupling of the second transistor by said load controller in the discharge mode of operation.

5. The apparatus according to claim 2 wherein said timing control block comprises a series of a resistor and a current generator coupled between said first channel coupling and a ground, a common node of said resistor and said current generator being coupled to the control coupling of the second transistor by said load controller in the discharge mode of operation.

6. The apparatus according to claim 5 wherein said timing control block is configured to change a current of said current generator according to a temperature.

7. The apparatus according to claim 1 wherein said first and second transistors are MOS transistors, said first channel coupling is a drain coupling, a second channel coupling is a source coupling, and said control coupling is a gate coupling.

8. The apparatus of claim 1 wherein the at least one pair of transistors are part of a driving circuit of an integrated circuit implemented in a silicon plate, the driving circuit configured to drive an electromagnetic load.

9. The apparatus according to claim 8, further comprising a temperature sensor integrated in said silicon plate and configured to generate an indication of a temperature, wherein said timing control block comprises a series of a resistor and a current generator coupled between said first channel coupling and a ground, a common node of said resistor and said current generator being connected to the control coupling of the second transistor by said load controller in the discharge mode of operation, wherein the timing control block is coupled to the temperature sensor and is configured to change a current of said current generator based on the indication of a temperature.

10. The apparatus of claim 1 wherein the load controller is configured to control the switching so that the voltage between couplings of said second transistor created by the current from the electromagnetic load crossing the inherent diode exceeds a conduction threshold voltage of the second transistor.

11. A method, comprising, under control of a least one processing device:
driving an electromagnetic load by controlling a plurality of transistors to produce inductive load drive signals, wherein the driving includes:
in a discharge mode of operation,
switching off at least a first transistor and a second transistor of the plurality of transistors, said first transistor comprising an inherent diode between channel couplings of the first transistor;
controlling a switch to couple a control coupling of the second transistor to a first channel coupling of the second transistor; and
coupling the first and second transistors to form a current path with the electromagnetic load to cause current from said electromagnetic load to cross said inherent diode, wherein the current creates a voltage between channel couplings of said second transistor which exceeds a conduction threshold voltage of the second transistor.

12. The method according to claim 11 wherein driving the electromagnetic load comprises measuring a time period for a current through said electromagnetic load to reach a reference current before said discharge mode of operation.

13. The method of claimer 11, further comprising increasing a voltage between the first and a second channel coupling of the second transistor in the discharge mode of operation.

14. The method of claim 11, comprising coupling a series of a resistor and a plurality of diodes arranged reciprocally in series, between said first channel coupling and the control coupling of the second transistor in the discharge mode of operation.

15. The method of claim 11, comprising coupling a series of first and second resistors between said first channel coupling and a ground and coupling a common node of said first and second resistors to the control coupling of the second transistor in the discharge mode of operation.

16. The method of claim 11, comprising coupling a series of a resistor and a current generator between said first channel coupling and a ground, and coupling a common node of said resistor and said current generator to the control coupling of the second transistor in the discharge mode of operation.

17. The method of claim 11, further comprising controlling a discharge time period in the discharge mode of operation.

18. The method of claim 17 wherein controlling a discharge time period comprises controlling a current of a current generator according to a temperature.

19. A system, comprising:
a plurality of transistors configured to receive at least one control signal and to produce inductive load drive signals in response, wherein at least a first transistor of the plurality of transistors comprises an inherent diode; and
a switch configured to, in a discharging mode of operation of the system, couple a control coupling of a second transistor in the plurality of transistors to a first channel coupling of the second transistor, wherein the first and second transistors are configured in the discharging mode of operation to form a current path so that current passing through the inherent diode of the first transistor creates a voltage exceeding a conduction threshold voltage of the second transistor between channel couplings of the second transistor.

20. The system of claim 19, further comprising:
a motor comprising three motor windings configured to receive the inductive load drive signals from the plurality of transistors, wherein the current path comprises two motor windings of the motor, the first transistor is part of a first transistor half bridge coupled between a supply voltage and a ground, and the second transistor is part of a second transistor half bridge coupled between the supply voltage and the ground.

21. The system of claim 19, further comprising a controller coupled to the plurality of transistors and the switch and configured to generate the at least one control signal provided to the plurality of transistors and a switch control signal.

22. The system of claim 21 wherein said first and second transistors are MOS transistors, said first channel coupling is a drain coupling, a second channel coupling is a source coupling, and said control coupling is a gate coupling.

23. The system of claim 21 comprising a timing control block configured to control a voltage between channel couplings of the second transistor in the discharge mode of operation.

24. The system of claim 23 wherein said timing control block comprises a series of a resistor and a plurality of diodes arranged in series, said plurality of diodes coupled between said first channel coupling and the control coupling of the second transistor in the discharge mode of operation.

25. The system of claim 23 wherein said timing control block comprises a series of first and second resistors coupled between said first channel coupling and a ground, a common node of said first and second resistors being coupled to the control coupling of the second transistor in the discharge mode of operation.

26. The system of claim 23 wherein said timing control block comprises a series of a resistor and a current generator coupled between said first channel coupling and a ground, a common node of said resistor and said current generator being coupled to the control coupling of the second transistor in the discharge mode of operation.

27. The system of claim 26 wherein said timing control block is configured to change a current of said current generator according to a temperature.

28. A non-transitory computer-readable medium containing contents that cause an electronic device to perform a method, the method comprising:
driving an electromagnetic load by controlling a plurality of transistors to produce inductive load drive signals, the driving including:
in a discharge mode of operation,
switching off at least a first transistor and a second transistor of a plurality of transistors, said first transistor comprising an inherent diode between channel connections of the first transistor;
controlling a switch to couple a channel connection of the second transistor to a control connection of the second transistor; and
coupling the first and second transistors to form a current path with the electromagnetic load so that current from said electromagnetic load, crossing said inherent diode, creates a voltage between channel connections of said second transistor which exceeds a conduction threshold voltage of the second transistor.

29. The non-transitory computer-readable medium of claim 28 wherein driving the electromagnetic load comprises measuring a time period for a current through said electromagnetic load to reach a reference current before said discharge mode of operation.

30. The non-transitory computer-readable medium of claim 28 wherein the method further comprises increasing a voltage between the first and a second channel connection of the second transistor in the discharge mode of operation.

31. The non-transitory computer-readable medium of claim 28 wherein the method further comprises controlling a discharge time period in the discharge mode of operation.

32. The non-transitory computer-readable medium of claim 31 wherein controlling a discharge time period comprises controlling a current of a current generator according to a temperature.

* * * * *